United States Patent
Mukae et al.

(10) Patent No.: US 9,325,826 B2
(45) Date of Patent: Apr. 26, 2016

(54) EXTERNAL BATTERY AND SATELLITE COMMUNICATION TERMINAL

(75) Inventors: Hisayuki Mukae, Tokyo (JP); Hiroshi Koyama, Tokyo (JP); Tsutomu Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/399,237

(22) PCT Filed: Jun. 20, 2012

(86) PCT No.: PCT/JP2012/065745
§ 371 (c)(1),
(2), (4) Date: Nov. 6, 2014

(87) PCT Pub. No.: WO2013/190660
PCT Pub. Date: Dec. 27, 2013

(65) Prior Publication Data
US 2015/0133189 A1    May 14, 2015

(51) Int. Cl.
*H04M 1/00*    (2006.01)
*H04M 1/725*    (2006.01)
*H04W 84/06*    (2009.01)
(Continued)

(52) U.S. Cl.
CPC ......... *H04M 1/72527* (2013.01); *H02J 7/0052* (2013.01); *H02J 7/0054* (2013.01); *H04B 7/1851* (2013.01); *H04B 7/1853* (2013.01); *H04W 84/06* (2013.01); *H04W 88/06* (2013.01)

(58) Field of Classification Search
CPC ..................... H04M 1/72522; H04M 1/72519; H04M 1/0262; H04J 17/00
USPC .......................... 455/556.1, 572, 550.1, 41.2
See application file for complete search history.

(56) References Cited

U.S. PATENT DOCUMENTS

| 5,535,430 A | 7/1996 | Aoki et al. |
| 5,786,789 A | 7/1998 | Janky |

(Continued)

FOREIGN PATENT DOCUMENTS

| JP | 6 276145 | 9/1994 |
| JP | 09 173304 | 7/1997 |

(Continued)

OTHER PUBLICATIONS

Koubayashi,Y. et al., "Proposal and Basic Experiment for Information Gathering/ Sharing System by Terrestrial and Satellite System", IEICE Technical Report, vol. 109, No. 427, pp. 43-48 (Feb. 2010), with English abstract.

(Continued)

*Primary Examiner* — Danh Le
(74) *Attorney, Agent, or Firm* — Oblon, McClelland, Maier & Neustadt, L.L.P.

(57) ABSTRACT

A device that can realize satellite communication with a popularized mobile phone in a case a large number of users communicate at a same time such as in a case where disaster strikes and the like. An external battery for charging a mobile phone includes a satellite antenna for performing satellite communication via a satellite communication channel and a satellite communication unit which causes the mobile phone to perform the satellite communication via the satellite antenna. The mobile phone and the external battery are connected with a cable and the like, and thereby a satellite communication terminal is configured.

14 Claims, 9 Drawing Sheets

(51) Int. Cl.
 *H04W 88/06* (2009.01)
 *H02J 7/00* (2006.01)
 *H04B 7/185* (2006.01)

(56) References Cited

U.S. PATENT DOCUMENTS

| | | | |
|---|---|---|---|
| 5,903,835 A | 5/1999 | Dent | |
| 6,324,380 B1 | 11/2001 | Kiuchi et al. | |
| 6,501,939 B1 | 12/2002 | Dent | |
| 6,529,707 B1 | 3/2003 | Dent | |
| 6,580,921 B1 | 6/2003 | Inoue et al. | |
| 6,696,922 B1 | 2/2004 | Wong | |
| 7,286,857 B1 | 10/2007 | Walker | |
| RE40,910 E | 9/2009 | Aoki et al. | |
| 7,949,335 B2* | 5/2011 | Stefani | H04W 92/02 455/426.1 |
| 2003/0060195 A1 | 3/2003 | Dent | |
| 2003/0171097 A1 | 9/2003 | Soejima et al. | |
| 2005/0001720 A1* | 1/2005 | Mason | G01C 21/206 340/539.13 |
| 2005/0091110 A1* | 4/2005 | Hentz | H04B 7/18513 705/14.64 |
| 2006/0150223 A1* | 7/2006 | Matsuo | H01Q 25/00 725/81 |
| 2006/0294550 A1* | 12/2006 | Matsuo | H04H 20/06 725/68 |
| 2010/0151917 A1* | 6/2010 | Wilson | H04M 1/6075 455/571 |
| 2012/0322382 A1* | 12/2012 | Toyoda | H02J 17/00 455/41.2 |

FOREIGN PATENT DOCUMENTS

| | | |
|---|---|---|
| JP | 9 509549 | 9/1997 |
| JP | 10 243453 | 9/1998 |
| JP | 2000 106540 | 4/2000 |
| JP | 2001 268652 | 9/2001 |
| JP | 2004 297131 | 10/2004 |
| JP | 2006 279712 | 10/2006 |
| KR | 2006-0015800 A | 2/2006 |
| WO | 98 39859 | 9/1998 |
| WO | 01 72066 | 9/2001 |

OTHER PUBLICATIONS

International Search Report Issued Jul. 17, 2012 in PCT/JP12/065745 Filed Jun. 20, 2012.
Office Action issued on Apr. 14, 2015 in Japanese Patent Application No. 2014-521148 with Partial English translation.
Extended European Search Report issued Jan. 29, 2016 in Patent Application No. 12879270.2.
Korean Office Action issued Jan. 13, 2016 in Korean Patent Application No. 10-2015-7000294 with partial English translation, 10 pages.

* cited by examiner

EXTERNAL BATTERY AND SATELLITE COMMUNICATION TERMINAL

TECHNICAL FIELD

The present invention relates to an external battery for charging a mobile communication terminal such as a mobile phone and the like. In particular, the present invention relates to an external battery having a function to cause a mobile communication terminal to perform satellite communication. Further, the present invention relates to a satellite communication terminal having the mobile communication terminal and the external battery.

BACKGROUND ART

In a case of contingencies such as disaster like earthquake in urban area, it is desired to promptly perform a rescue request and safety confirmation.

Presently, a lot of people have and always carry a mobile phone. Therefore, it is considered that a rescue request and safety information can be sent from the mobile phone to a disaster center and the like. However, in a case where disaster like earthquake occurs in urban area, a mobile communication channel might not be used due to the destruction of a base station and the like.

Patent literature 1 describes, in a case where disaster strikes, safety confirmation information can be collected from the mobile phones using the satellite communication channel. This makes possible to collect safety confirmation information even when the mobile communication channel cannot be used due to the destruction of the base station and the like.

CITATION LIST

Patent Literature

Patent Literature 1: JP2004-297131A

SUMMARY OF INVENTION

Technical Problem

As described in Patent Literature 1, if the satellite communication channel can be used in a case where disaster strikes, a rescue request and safety confirmation can be carried out promptly.

However, from a practical viewpoint, the frequency band is limited for the mobile communication terminal of the mobile phone and the like to perform the satellite communication using the satellite communication channel. Therefore, in a case where disaster strikes and the like, it is impossible to assign the frequency band sufficient to perform the satellite communication by the mobile communication terminal of a large number of users at the same time.

If the sufficient frequency band is not assigned, the mobile phone is required to have a large amount of electric power to obtain the transmission/reception power and a large antenna to obtain high antenna gain for performing the satellite communication. However, the popularized mobile phone is required to be downsized, so that the battery with large power capacity and the large antenna cannot be mounted. Therefore, it is difficult to perform the satellite communication using the popularized mobile phone.

The present invention aims to achieve the satellite communication using the popularized mobile communication terminal in a case where a large number of users communicate at the same time such as in a case where disaster strikes and the like.

Solution to Problem

According to the present invention, an external battery that charges a mobile communication terminal includes:
an electricity storage unit that stores electric power;
a charging unit that supplies the electric power stored in the electricity storage unit to the mobile communication terminal to charge the mobile communication terminal;
a satellite antenna to be used when performing satellite communication via a satellite communication channel; and
a satellite communication unit that causes the mobile communication terminal to perform the satellite communication of message including a self-position via the satellite antenna.

Advantageous Effects of Invention

The external battery related to the present invention includes not only a function to charge the mobile communication terminal, but also a function to cause the mobile communication terminal to perform the satellite communication.

Since the external battery does not have a number of functions like the mobile communication terminal, it is possible to mount the battery with large power capacity and a large antenna, while suppressing the largeness. Therefore, the external battery is combined with the mobile communication terminal, and thereby, in a case where a large number of users communicate at the same time such as in a case where disaster strikes and the like, the satellite communication can be achieved by the popularized mobile communication terminal.

Further, it is common to carry the external battery with the mobile communication terminal. Therefore, in a case of contingencies such as where disaster strikes and the like, the external battery is carried with the mobile communication terminal, and thus a rescue request and the like can be performed.

DESCRIPTION OF EMBODIMENTS

Embodiment 1

Figure 1:
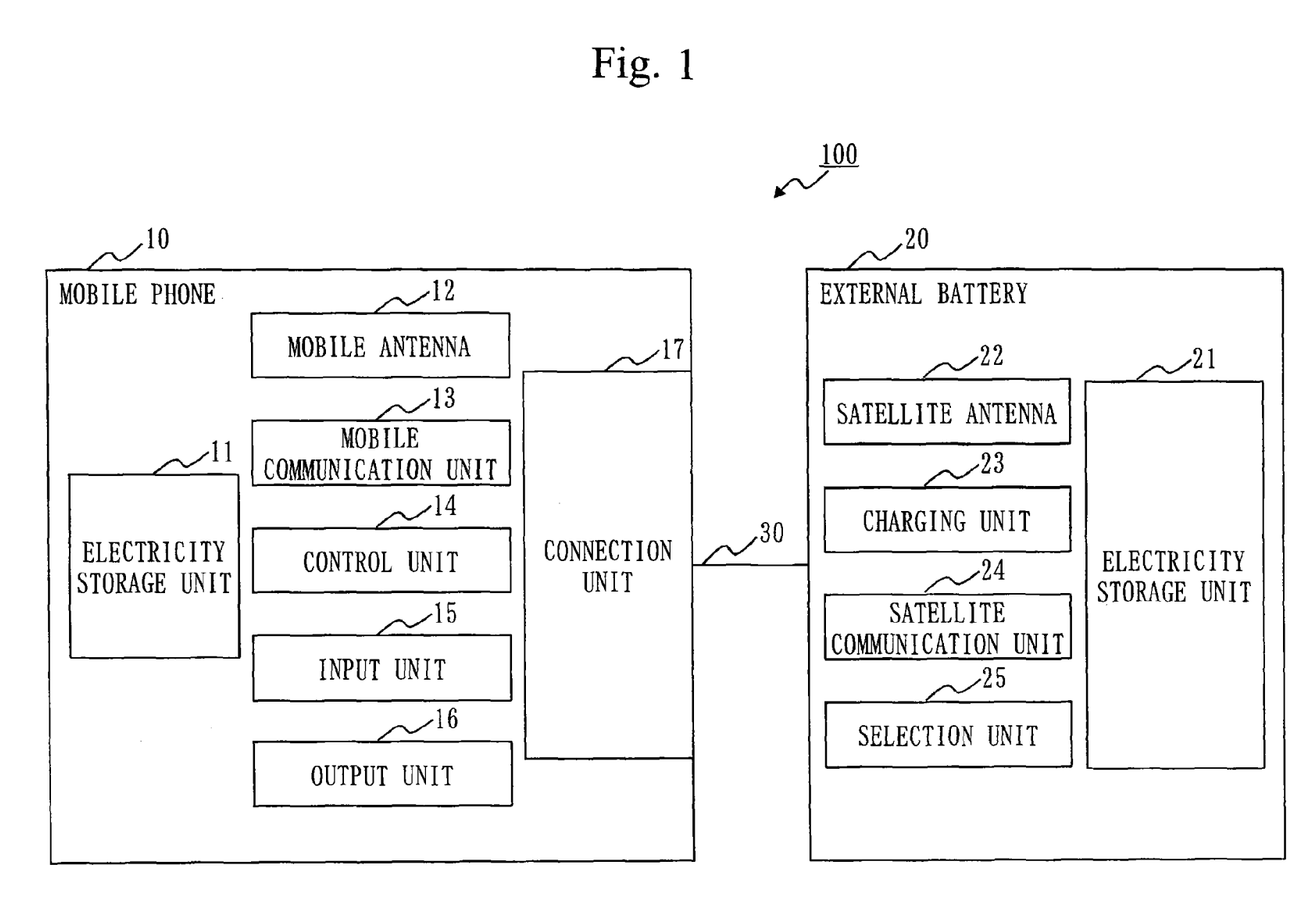
FIG. 1 is a configuration diagram of a satellite communication terminal 100 related to a first embodiment.

FIG. 1 is a configuration diagram of a satellite communication terminal 100 related to a first embodiment.

The satellite communication terminal 100 includes a mobile phone 10 (mobile communication terminal) such as smartphones and an external battery 20 for charging the mobile phone 10. The mobile phone 10 and the external battery 20 are connected via a cable 30.

The mobile phone 10 includes an electricity storage unit 11, a mobile antenna 12, a mobile communication unit 13, a control unit 14, an input unit 15, an output unit 16, and a connection unit 17.

The electricity storage unit 11 is an electric storage device such as lithium-ion battery for storing electric power to drive the mobile phone 10. The mobile antenna 12 is an antenna for performing communication (mobile communication, hereinafter) by a mobile communication channel which passes through a ground-based base station and the like. The mobile communication unit 13 is a function to perform the mobile communication via the mobile antenna 12. The control unit 14 is a processing device such as CPU which carries out various control according to inputs from the input unit 15 and the like. The input unit 15 is an input device such as a keyboard, a microphone, and the like for inputting character data, voice data, and the like. The output unit 16 is an output device such as an LCD, a speaker, and the like for outputting character data, voice data, and the like. The connection unit 17 is a connecting device for connecting to the electric power source and instruments such as the external battery 20; a cable 30 of USB standard and the like which can be used for both of supplying the electric power and transmitting signals is connected.

The external battery 20 includes an electricity storage unit 21, a satellite antenna 22, a charging unit 23, a satellite communication unit 24, and a selection unit 25.

The electricity storage unit 21 is an electric storage device such as lithium-ion battery which stores electric power for charging the mobile phone 10 as well as for driving the external battery 20. The satellite antenna 22 is an antenna for performing communication (satellite communication, hereinafter) using the satellite communication channel via quasi-zenith satellites. The charging unit 23 is a function to supply the electric power stored in the electricity storage unit 21 to the mobile phone 10 and to charge the electricity storage unit 11 of the mobile phone 10. The satellite communication unit 24 is a function to cause the mobile phone 10 to perform the satellite communication via the satellite antenna 22. The selection unit 25 is a function to make a selection of at least either of a charge mode for causing the charging unit 23 to charge and a communication mode for causing the satellite communication unit 24 to perform the satellite communication according to inputs from the input unit 15 and the like.

Here, functions explained above may be implemented by, for instance, software and the like. In this case, the software for implementing the functions may be stored in memory devices such as ROM, RAM or the like, and read and executed by the processing device such as CPU. Further, the functions may be implemented not by software but by circuits, devices, and the like.

Figure 2:
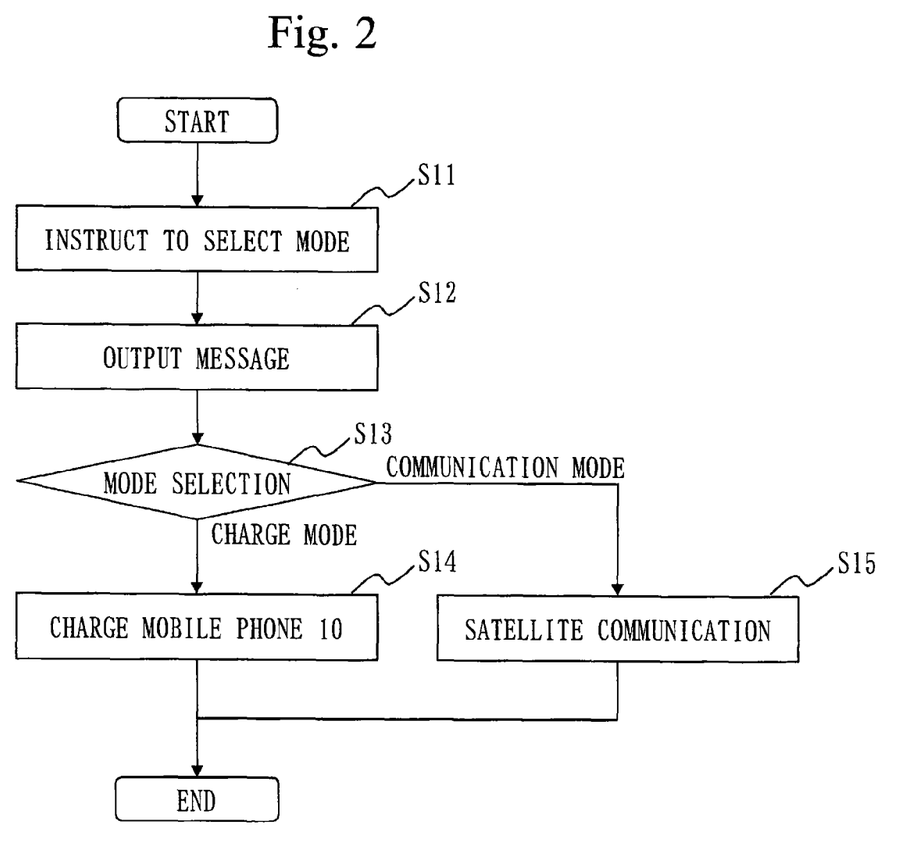
FIG. 2 is a flowchart showing an operation of the satellite communication terminal 100 related to the first embodiment.

FIG. 2 is a flowchart showing an operation of the satellite communication terminal 100 related to the first embodiment. FIG. 2 shows the operation of a case where the external battery 20 is connected to the connection unit 17.

Upon connecting the external battery 20 to the connection unit 17, the selection unit 25 is started; the selection unit 25 instructs the mobile phone 10 to select either of the charge mode and the communication mode (S11). Then, the control unit 14 receives the instruction, outputs the message to the output unit 16 (for instance, displays the message on LCD), and prompts the user to select either of the charge mode and the communication mode (S12). Then, according to the operation of the user, the input unit 15 selects at least either of the charge mode and the communication mode (S13).

If the charge mode is selected at S13, the charging unit 23 is started by the control unit 14, the charging unit 23 supplies the electric power stored in the electricity storage unit 21 to the mobile phone 10 to charge the electricity storage unit 11 (S14).

On the other hand, if the communication mode is selected at S13, the satellite communication unit 24 is started by the control unit 14, the satellite communication unit 24 connects the mobile phone 10 to the satellite communication channel via the satellite antenna 22 (S15). The mobile phone 10, when connected to the satellite communication channel, using the input unit 15 and the output unit 16, performs the satellite communication of transmission/receipt of the message with the predetermined number of characters or less including information showing a self-position and the like.

Here, at the normal time where the external battery 20 is not connected to the connection unit 17 of the mobile phone 10, the mobile phone 10 works as a general mobile phone. That is, at the normal time, the mobile communication unit 13 is started by the control unit 14, and the mobile phone 10 is connected to the mobile communication channel via the mobile antenna 12. Then, voice call, transmission/receipt of electronic mail, browsing websites, downloading application software and the like are carried out using the input unit 15 and the output unit 16.

Further, even when being charged at S14, the mobile phone 10 also works as the general mobile phone.

Here, the mobile phone 10 is not a particular one for performing the satellite communication, but a popularly used mobile phone. The general mobile phone 10 has been required to be multi-functional and as well to be downsized. Therefore, the electricity storage unit 11 cannot be enlarged; and it is impossible to store the sufficient electric power to perform the satellite communication using the narrow communication band in the electricity storage unit 11. Further, a large antenna for performing the satellite communication cannot be mounted on the mobile phone 10.

However, the external battery 20 is not required to be multi-functional or downsized like the mobile phone 10. Therefore, the electricity storage unit 21 can be enlarged to some extent, which enables to store the sufficient electric power to perform the satellite communication using the narrow communication band. Even if the electricity storage unit 21 cannot store the sufficient electric power, the electric power stored in the electricity storage unit 11 and the electric power stored in the electricity storage unit 21 can be combined to make the sufficient electric power. Further, a large antenna (satellite antenna 22) for performing the satellite communication can be mounted on the external battery 20.

As discussed above, in the satellite communication terminal 100 related to the first embodiment, the satellite antenna 22 and the like is mounted on the external battery 20, so that the satellite communication is achieved by working the mobile phone 10 and the external battery 20 together.

By the above, a weak spot that only the popularized mobile phone 10 cannot supply sufficient transmission/reception power and antenna gain is supplemented by the external battery 20, which enables the satellite communication by the popularized mobile phone 10.

As a result of this, in a case where disaster strikes and the like, a large number of users try to communicate at the same time, which enables the satellite communication by the popularized mobile phone 10. In particular, since the transmission/reception power and the antenna gain are high, the satellite communication is possible even in a circumstance where obstacles exist such as woods or nibbles. Further, even in a case where the satellite communication itself is difficult due to nibbles or shielding, it is possible to provide a rescue signal for rescue operation by a search party.

Here, it is desired to carry the external battery 20 with the mobile phone 10. Therefore, even if a large electricity storage unit 21 is desired, it is not possible to make it too large to carry. Similarly, even if a large antenna is desired, it is not possible to make it too large to carry.

However, since the external battery 20 is not multi-functional such as the mobile phone 10, there is no need to mount many components on the external battery 20. Further, the external battery 20 is rarely manipulated by hand like the mobile phone 10, and usually contained in a bag and the like. Therefore, if the external battery 20 and the mobile phone 10 are made to have similar size, it is possible to mount a larger electricity storage unit or a larger antenna on the external battery 20.

Further, in the above explanation, a cable 30 that can be used for both of the power supply and the signal transmission is connected to the connection unit 17. However, two cables of a cable for the power supply and a cable for the signal transmission can be connected to the connection unit 17. Further, in case of the satellite communication, the cable 30 is not connected to the connection unit 17, but wireless connection can be achieved.

Further, in the above explanation, in case of the satellite communication, messages with the predetermined number of characters or less are transmitted/received. However, it is also possible to transmit/receive voice calls or image data. However, as described above, since a sufficient frequency band is not assigned, the communication with large data amount might be difficult. Therefore, the communication with suppressed data amount is desired.

Further, in order to work the popularized mobile phone 10 and the external battery 20 together, additional functions may be required in the mobile phone 10. In this case, for instance, application software for implementing the additional functions can be downloaded from a predetermined website and the like to be installed by the mobile phone 10. Obviously, not limited to the above, additional functions may be introduced to the mobile phone 10 in some manners.

Further, in the above explanation, quasi-zenith satellites are used for the satellite in the satellite communication. Not limited to this, the satellite communication can be mediated by another satellite such as a geostationary satellite. However, since the quasi-zenith satellite is located at the zenith with a high elevation angle, it is possible to secure the communication channel under a circumstance where the communication eyesight to the geostationary satellite is interrupted due to the mountain shade or building shade and the like. Therefore, a rescue request can be achieved from mountain area or urban area.

Further, an S band, for example, is used as the frequency band for the satellite communication. The S band is the frequency band which is allowed to use by the mobile communication among the satellite communication channels, and further, it is possible to obtain sufficiently effective transmission/receipt sensitivity by the antenna with a dimension of around 50 mm×50 mm×5 mm for the mobile communication. Therefore, it is easy to implement this antenna on the external battery 20.

Further, in the above explanation, on connecting to the satellite communication channel, the mobile phone 10 performs the satellite communication such as the transmission/reception of the messages and the like.

Here, in case of sending a message, when the external battery 20 receives a transmission instruction from the mobile phone 10, the instructed message is sent via the satellite communication channel. That is, the external battery 20 works by receiving the instruction from the mobile phone 10.

On the other hand, in case of receiving the message, when receiving the message via the satellite communication channel, the external battery 20 sends the message to the mobile phone 10. That is, the external battery 20, on receiving the message via the satellite communication channel, sends the message to the mobile phone 10 even when no instruction from the mobile phone 10 is received to obtain the message. Therefore, it is unnecessary for the mobile phone 10 to periodically check if the external battery 20 receives the message or not; and the mobile phone 10 may become sleep state. Therefore, the power consumption of the mobile phone 10 can be suppressed.

Here, when the external battery 20 sends the message to the mobile phone 10, if the mobile phone 10 is in the sleep state, the external battery 20 may activate the mobile phone 10 and send the message to the mobile phone 10. For instance, the above operation can be performed if the mobile phone 10 is set to receive the activation signal from the external battery 20 even when the mobile phone 10 is in the sleep state.

Further, in the above explanation, either of the charge mode and the communication mode is selected. However, the charge mode and the communication mode can be selected at the same time. In this case, the satellite communication can be performed by the mobile phone 10, while the electricity storage unit 11 is being charged. Therefore, the satellite communication can be performed by the mobile phone 10 even if the electricity storage unit 11 stores less amount of electric power.

Further, in the above explanation, the mobile phone 10 is an example of a mobile communication terminal. However, another type of communication terminal other than the mobile phone 10 may be used as long as it is carried by the user.

Embodiment 2

In the first embodiment, it is explained that the user is prompted to select the charge mode and the communication mode. In the second embodiment, the charge mode and the communication mode can be selected automatically according to whether or not an emergency broadcast signal is received from the satellite.

A part being different from the first embodiment will be mainly explained in the second embodiment.

In the first embodiment, at S11 to S13 of FIG. 2, the user is prompted to select the charge mode or the communication mode.

On the contrary to this, in the second embodiment, when the external battery 20 is connected, according to whether or not a satellite communication unit 24 receives the emergency broadcast signal from the satellite, a selection unit 25 selects the charge mode or the communication mode. Specifically, the selection unit 25, when the external battery 20 is connected, selects the charge mode if the emergency broadcast signal is not received, and selects the communication mode if the emergency broadcast signal is received.

Further, if the external battery 20 is connected to the mobile phone 10 and the charge mode is being selected, when the satellite communication unit 24 receives the emergency broadcast signal, the selection unit 25 switches the charge mode to the communication mode.

For instance, in a case where disaster strikes and the like, the emergency broadcast signal is sent from the satellite to make the communication mode be automatically selected. Because, in a case where disaster strikes and the like, there may be a case where the operation to select the communication mode is bothersome or difficult.

As discussed above, in the satellite communication terminal 100 related to the second embodiment, according to whether or not the emergency broadcast signal is received from the satellite, the charge mode or the communication mode can be selected automatically. Therefore, the user does not need to do the bothersome operation, which improves the convenience.

Here, the external battery 20 may be provided with a display device such as an LCD, and when the emergency broadcast signal is received, the receipt of the emergency broadcast signal may be displayed to notify the user. Further, the external battery 20 may be provided with a speaker, and when the emergency broadcast signal is received, the receipt of the emergency broadcast signal may be notified to the user by sound.

Further, there may be a case where without receiving the emergency broadcast signal, it is necessary to perform the satellite communication by some reason. Therefore, for instance, the charge mode and the communication mode may be switched according to the operation of the user from an input unit 15.

Embodiment 3

In the second embodiment, according to whether or not the emergency broadcast signal is received from the satellite, the charge mode or the communication mode can be selected automatically. In the third embodiment, it will be explained that the charge mode or the communication mode can be selected automatically according to whether or not the mobile communication can be performed.

In the third embodiment, a part being different from the first embodiment will be mainly explained.

In the first embodiment, at S11 to S13 of FIG. 2, the user is prompted to select the charge mode or the communication mode.

On the contrary to the above, in the third embodiment, when the external battery 20 is connected, the selection unit 25 selects the charge mode or the communication mode according to whether or not the mobile phone 10 can perform the mobile communication via the mobile antenna 12. Specifically, the selection unit 25, when the external battery 20 is connected, if the mobile communication is available, selects the charge mode, and if the mobile communication is not available, selects the communication mode.

Further, when the external battery 20 is connected to the mobile phone 10, and when the charge mode is being selected, if the state in which the mobile communication is not available continues for a certain time period or more, it is also possible to switch to the communication mode.

The state in which the mobile communication is not available is, for instance, a case where electrical wave for the mobile communication cannot be received continuously for equal to or greater than a certain time period or where the mobile communication channel is in congestion state.

The above control is performed because, in a case where the mobile communication is available, the necessity of the satellite communication is low, and thus the user does not need to be prompted to select the charge mode or the communication mode. In particular, in a case where disaster strikes and the like, there may be a case where the operation to select the communication mode is bothersome or difficult.

As discussed above, in the satellite communication terminal 100 related to the third embodiment, the charge mode or the communication mode can be selected automatically according to the state of the mobile communication. Therefore, the user does not need to do the bothersome operation, which improves the convenience.

Here, even if the mobile communication is available, the satellite communication might be necessary for some reason. Therefore, for instance, the charge mode and the communication mode can be switched according to the operation of the user from the input unit 15.

Embodiment 4

The fourth embodiment will explain that authentication is performed at the time of the satellite communication.

In the fourth embodiment, a part being different from the first embodiment will be mainly explained.

Figure 3:
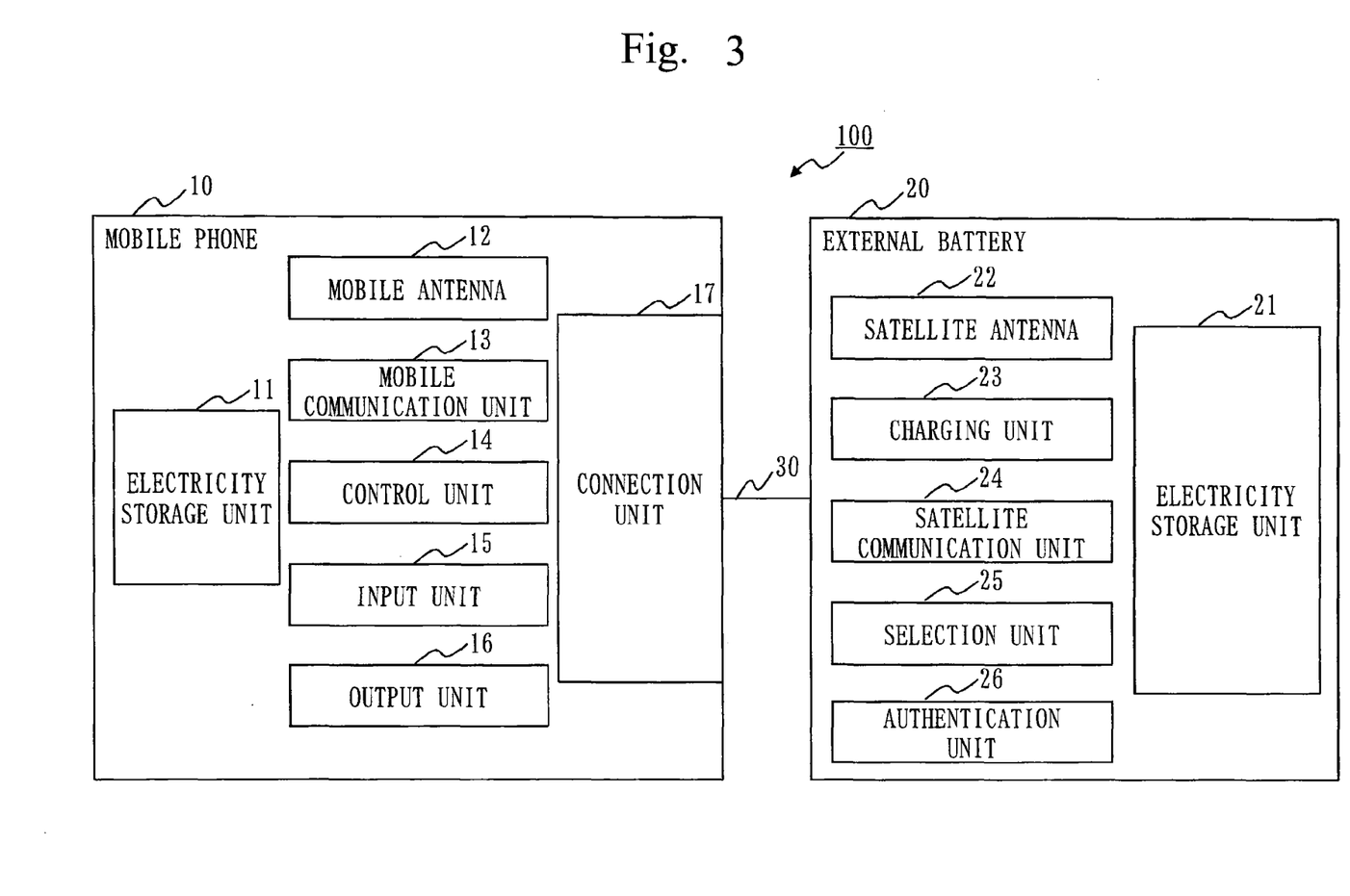
FIG. 3 is a configuration diagram of a satellite communication terminal 100 related to a fourth embodiment.

FIG. 3 is a configuration diagram of the satellite communication terminal 100 related to the fourth embodiment.

The satellite communication terminal 100 shown in FIG. 3 includes, in addition to the configuration of the satellite communication terminal 100 shown in FIG. 1, an authentication unit 26 in the external battery 20.

The authentication unit 26 carries out user authentication by making the user enter an ID and a password and the like.

Figure 4:
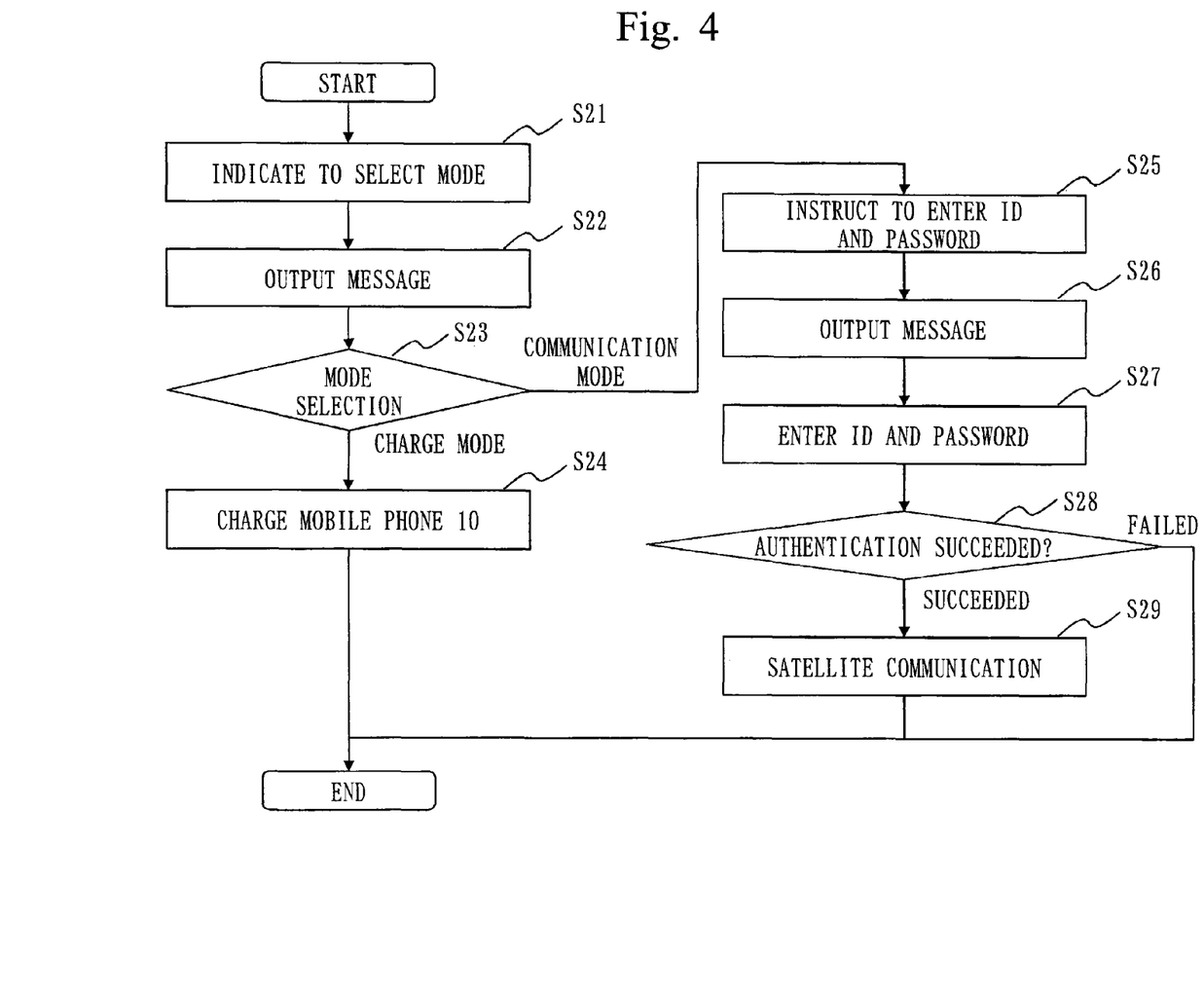
FIG. 4 is a flowchart showing an operation of the satellite communication terminal 100 related to the fourth embodiment.

FIG. 4 is a flowchart showing an operation of the satellite communication terminal 100 related to the fourth embodiment. FIG. 4 shows the operation when the external battery 20 is connected to the connection unit 17; and similarly to the first embodiment, when the external battery 20 is connected, the user is prompted to select the charge mode or the communication mode.

The operations from S21 to S24 are the same as the ones from S11 to S14 shown in FIG. 2, and the explanation will be omitted.

When the communication mode is selected at S23, the authentication unit 26 instructs the mobile phone 10 to enter the ID and password (S25). Then, the control unit 14 receives the instruction, outputs the message to the output unit 16, and prompts the user to enter the ID and password (S26). According to the operation of the user, the input unit 15 inputs the ID and password (S27). The authentication unit 26 carries out the user authentication based on the entered ID and password and the ID and password which have been previously registered (S28).

If the user authentication succeeded at S28, the satellite communication unit 24 is started by the control unit 14, the satellite communication unit 24 connects the mobile phone 10 to the satellite communication channel via the satellite antenna 22 (S29). On the other hand, if the user authentication failed at S28, the satellite communication is not allowed and the mobile phone 10 is not connected to the satellite communication channel.

In the above explanation, if the user authentication failed, the satellite communication is not allowed. However, in case of emergency such as when a rescue request is issued, there may be a case where it is better that the satellite communication is made available regardless of whether or not the user authentication succeeded. Then, if the user authentication failed, the satellite communication may be made possible to communicate with only a predetermined communication partner.

Further, in the above explanation, similarly to the first embodiment, when the external battery 20 is connected, the user is prompted to select the charge mode or the communication mode. However, similarly to the second embodiment, when the external battery 20 is connected, the charge mode or the communication mode can be selected according to the state of the mobile communication. In this case, after the communication mode is selected, until the user authentication is carried out, the satellite communication can be limited with only a predetermined communication partner; and if the user authentication succeeds, the satellite communication can be performed with an arbitrary communication partner.

As discussed above, in the satellite communication terminal 100 related to the fourth embodiment, if the user authentication succeeds, the mobile phone 10 is allowed to perform the satellite communication. Therefore, it is possible to prevent a person other than the registered user from performing the satellite communication.

On the other hand, a person other than the registered user can perform the satellite communication with the predetermined communication partner. Therefore, anyone can perform a rescue request and the like in case of emergency.

Further, the user authentication is carried out, thereby specifying a user who has performed the satellite communication. Therefore, the specified user can be charged for the satellite communication. Here, the charging can be paid in arrears or in advance.

Further, the authentication unit 26 may carry out, not limited to the authentication using the ID and password, the user authentication by another method such as the biometric authentication.

Embodiment 5

The fifth embodiment will explain that the external battery 20 further includes an antenna that receives positioning signals from the satellites such as the quasi-zenith satellites.

In the fifth embodiment, a part being different from the first embodiment will be mainly explained.

Figure 5:
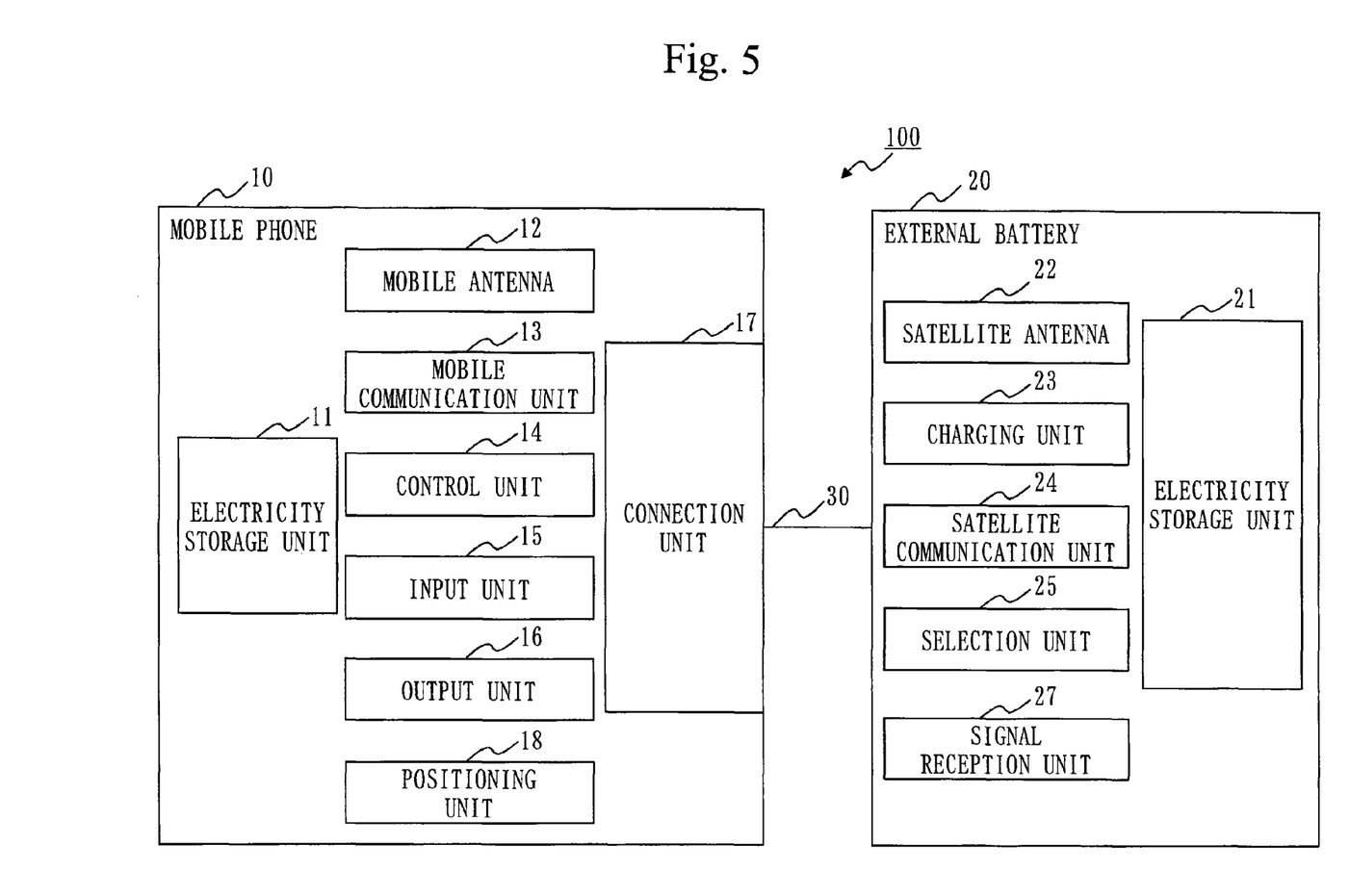
FIG. 5 is a configuration diagram of a satellite communication terminal 100 related to a fifth embodiment.

FIG. 5 is a configuration diagram of the satellite communication terminal 100 related to the fifth embodiment.

As for the configuration of the satellite communication terminal 100 shown in FIG. 5, in addition to the configuration of the satellite communication terminal 100 shown in FIG. 1, the mobile phone 10 includes a positioning unit 18, and the external battery 20 includes a signal reception unit 27.

The positioning unit 18 is a function to specify the location of the satellite communication terminal 100 based on the positioning signal sent from the satellite. The positioning signal includes a positioning supplemental signal that is used for measuring the distance and a positioning reinforcing signal including information that contributes the improvement of the accuracy. Here, the positioning signal may include both or either of the positioning supplemental signal and the positioning reinforcing signal.

The signal reception unit 27 is an antenna that receives the positioning signals sent from the satellites such as the quasi-zenith satellites. In particular, the signal reception unit 27 is an antenna that can receive the positioning signals of a plurality of frequency bands. For instance, the signal reception unit 27 is an antenna that can receive the L1 band and the L2 band, or an antenna that can receive the L1 band and the L5 band.

Figure 6:
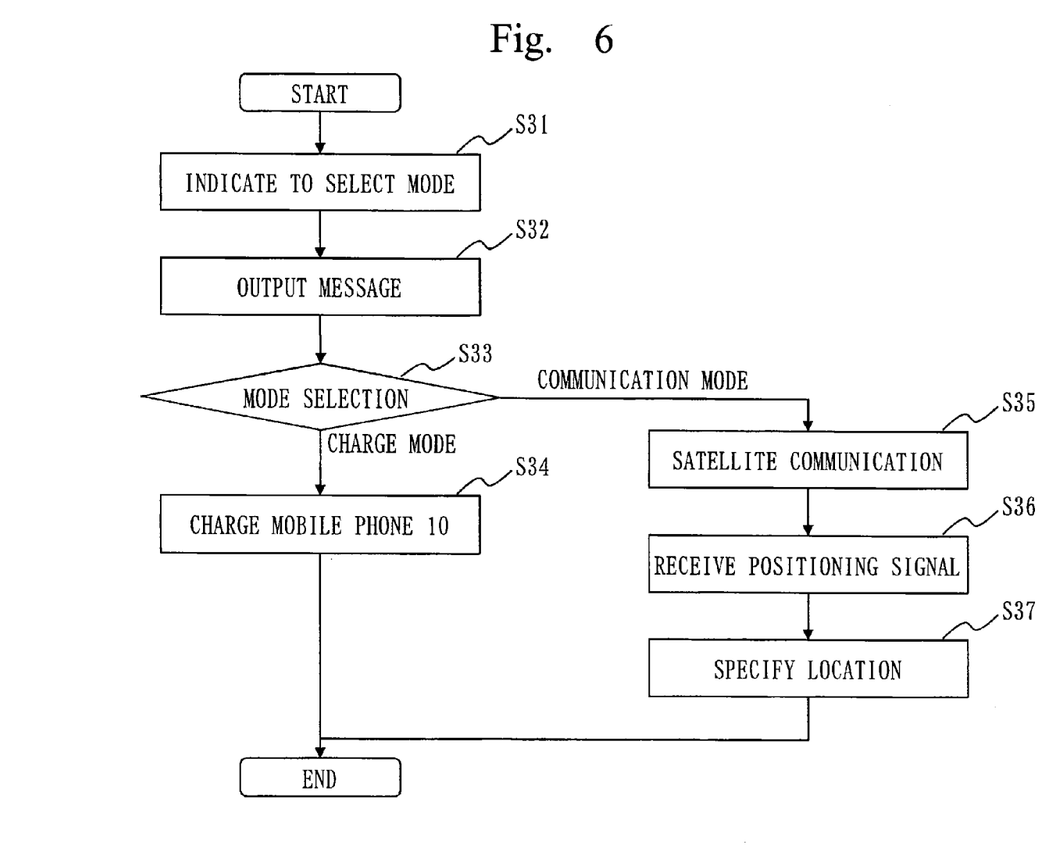
FIG. 6 is a flowchart showing an operation of the satellite communication terminal 100 related to the fifth embodiment.

FIG. 6 is a flowchart showing an operation of the satellite communication terminal 100 related to the fifth embodiment. FIG. 6 shows the operation of a case where the external battery 20 is connected to the connection unit 17; similarly to the first embodiment, FIG. 6 shows the operation of prompting the user to select between the charge mode and the communication mode in a case where the external battery 20 is connected.

The operations from S31 to S35 are the same as the ones from S11 to S15 shown in FIG. 2, and thus the explanation will be omitted.

In a case where the communication mode is selected at S33, subsequent to S35, the signal reception unit 27 is started by the control unit 14, the signal reception unit 27 receives the positioning signal and sends the signal to the mobile phone 10 (at S36). Then, the positioning unit 18 specifies the location of the satellite communication terminal 100 based on the positioning signal received by the signal reception unit 27 (S37). The location information showing the location of the specified satellite communication terminal 100 may be sent to the communication partner via the satellite communication according to an input from the input unit 15.

As discussed above, in the satellite communication terminal 100 related to the fifth embodiment, the external battery 20 includes the signal reception unit 27. In the disaster center and the like which receives the rescue request, it is necessary to specify the location of the requester. The external battery 20 is provided with the signal reception unit 27, which enables to specify the location of the requester, and the specified location can be informed to the disaster center and the like.

Here, some popularized mobile phones 10 include a GPS (Global Positioning System) antenna.

However, the antenna provided to the popularized mobile phone 10, since a large antenna cannot be mounted due to the downsizing request and the like for the mobile phone 10, is a one frequency antenna. Therefore, the positioning accuracy is low.

Further, the popularized mobile phone 10 specifies the location by an assisted GPS. In a case where disaster strikes and the like, when the ground station is damaged, the assisted GPS might become impossible to use. Then, continuous positioning by the satellite becomes necessary, which requires frequent receipt of positioning signals. As a result of this, the electric power of the mobile phone 10 is consumed in a short time.

On the contrary to the above, in a case where the external battery 20 is provided with the signal reception unit 27, a large antenna can be used, and thus the signal reception unit 27 can receive the positioning signals of a plurality of frequency bands. Therefore, the positioning accuracy can be improved. Further, the positioning signal is received by the external battery 20, so that the power consumption of the mobile phone 10 can be suppressed.

In the above explanation, the positioning unit 18 provided to the mobile phone 10 specifies the location based on the positioning signal. However, the function to specify the location based on the positioning signal may be included in the external battery 20, and the location may be specified by the external battery 20. The above operation can further suppress the power consumption of the mobile phone 10.

Further, in the above explanation, when the communication mode is selected, the signal reception unit 27 receives the positioning signal. However, regardless of whether or not the communication mode is selected, when the positioning accuracy obtained by the configuration of the mobile phone 10 itself (the positioning function included in the mobile phone 10) becomes low, the mobile phone 10 may issue a request to start the signal reception unit 27. In another way, in a case where the remaining power of the electricity storage unit 11 becomes equal to or less than a certain amount, the mobile phone 10 may issue a request to start the signal reception unit 27. Then, the signal reception unit 27 can receive the positioning signal in a case where the starting request is issued from the mobile phone 10.

The case where the positioning accuracy obtained by the configuration of the mobile phone 10 itself becomes low is, for instance, when the assisted GPS cannot be used, that is, the positioning information cannot be obtained via the ground station, and the like.

Further, the signal reception unit 27, on receiving the positioning signal, even if the instruction to obtain the positioning signal is not received from the mobile phone 10, sends the positioning signal to the mobile phone 10. Therefore, the mobile phone 10 does not need to periodically check whether or not the external battery 20 receives the positioning signal, and the mobile phone 10 can be in the sleep state. Therefore, the power consumption of the mobile phone 10 can be suppressed.

Embodiment 6

The sixth embodiment will explain that the external battery 20 further includes a function to measure biological information such as blood pressure, pulsation, blood glucose level and the like.

Figure 7:
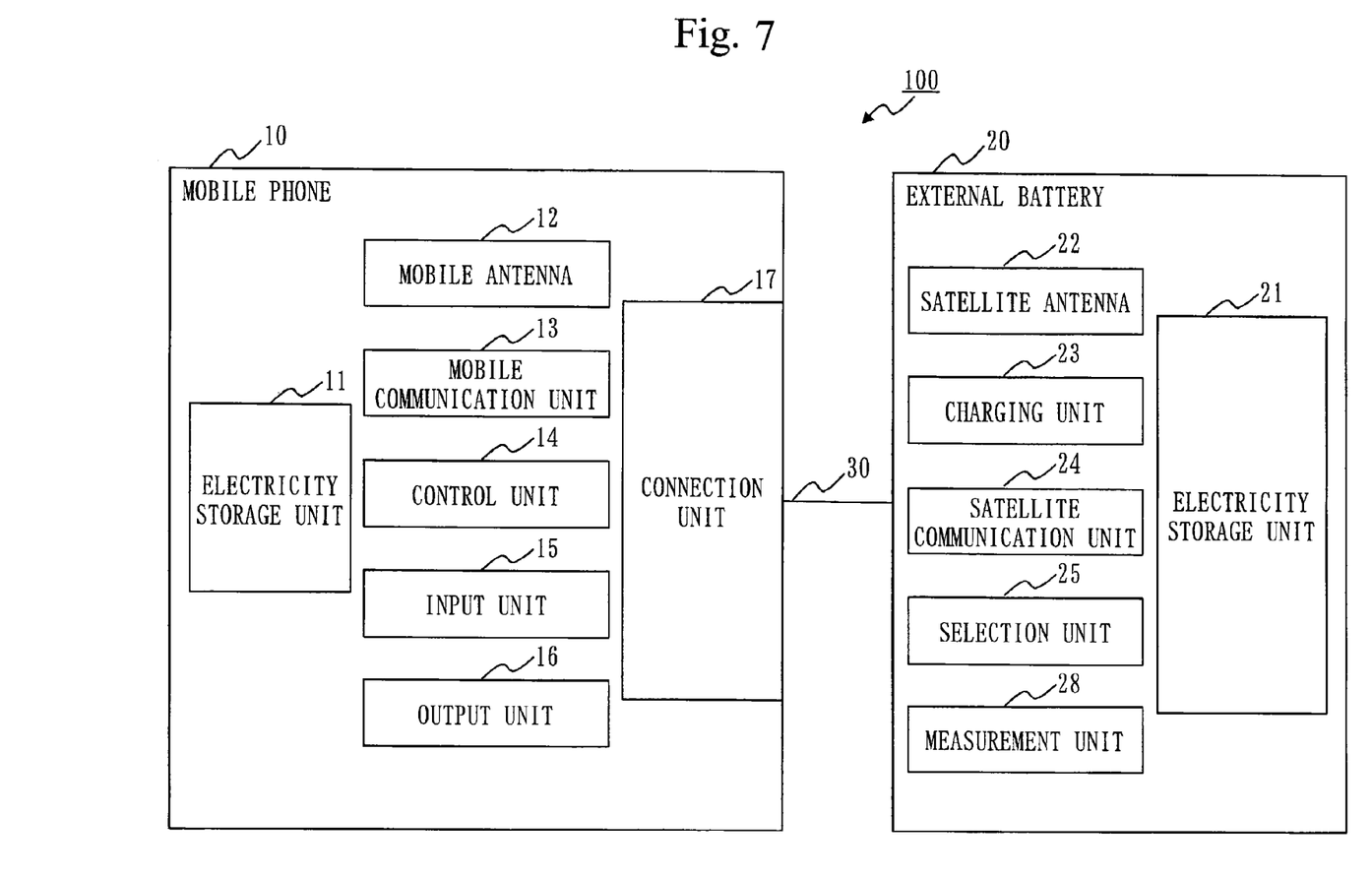
FIG. 7 is a configuration diagram of a satellite communication terminal 100 related to a sixth embodiment.

FIG. 7 is a configuration diagram of a satellite communication terminal 100 related to the sixth embodiment.

The satellite communication terminal 100 shown in FIG. 7 includes, in addition to the configuration of the satellite communication terminal 100 shown in FIG. 1, a measurement unit 28 in the external battery 20.

The measurement unit 28 is a measurement device to measure biological information such as blood pressure, pulsation, blood glucose level and the like.

For instance, the user suffering from disease, in a case where disaster strikes and the like, the biological information is measured by the measurement unit 28 and sent to the disaster center via the satellite communication. The above operation enables to confirm the status of the user's disease at the disaster center, and an appropriate treatment can be taken. Here, in a case where an abnormal acceleration is detected by acceleration information obtained by processing the positioning signal, it is also possible to react similarly by treating the abnormal acceleration as accident detection information; at this time, it is needless to say that it can be the starting request from the sleep state.

Here, the measurement unit 28 may previously store the user's personal hospital and the like as a destination of the information. In this case, the biological information is sent not to the disaster center, but to the destination registered previously; and thereby it is possible to check the status of user's disease more appropriately.

As discussed above, in the satellite communication terminal 100 related to the sixth embodiment, the satellite communication terminal 100 includes the measurement unit 28. Based on the biological information measured by the measurement unit 28, it is possible to understand the status of the user's disease, and to go to rescue the user with necessary instruments and the like.

Here, not limited to a case where disaster strikes, but also at the normal time, the biological information measured by the measurement unit 28 can be sent to the user's personal hospital, and thereby an ambulance can be deployed.

Embodiment 7

The seventh embodiment, it will be explained that route information showing an escape route and the like is stored in the external battery 20.

In the seventh embodiment, a part being different from the first embodiment will be mainly explained.

Figure 8:
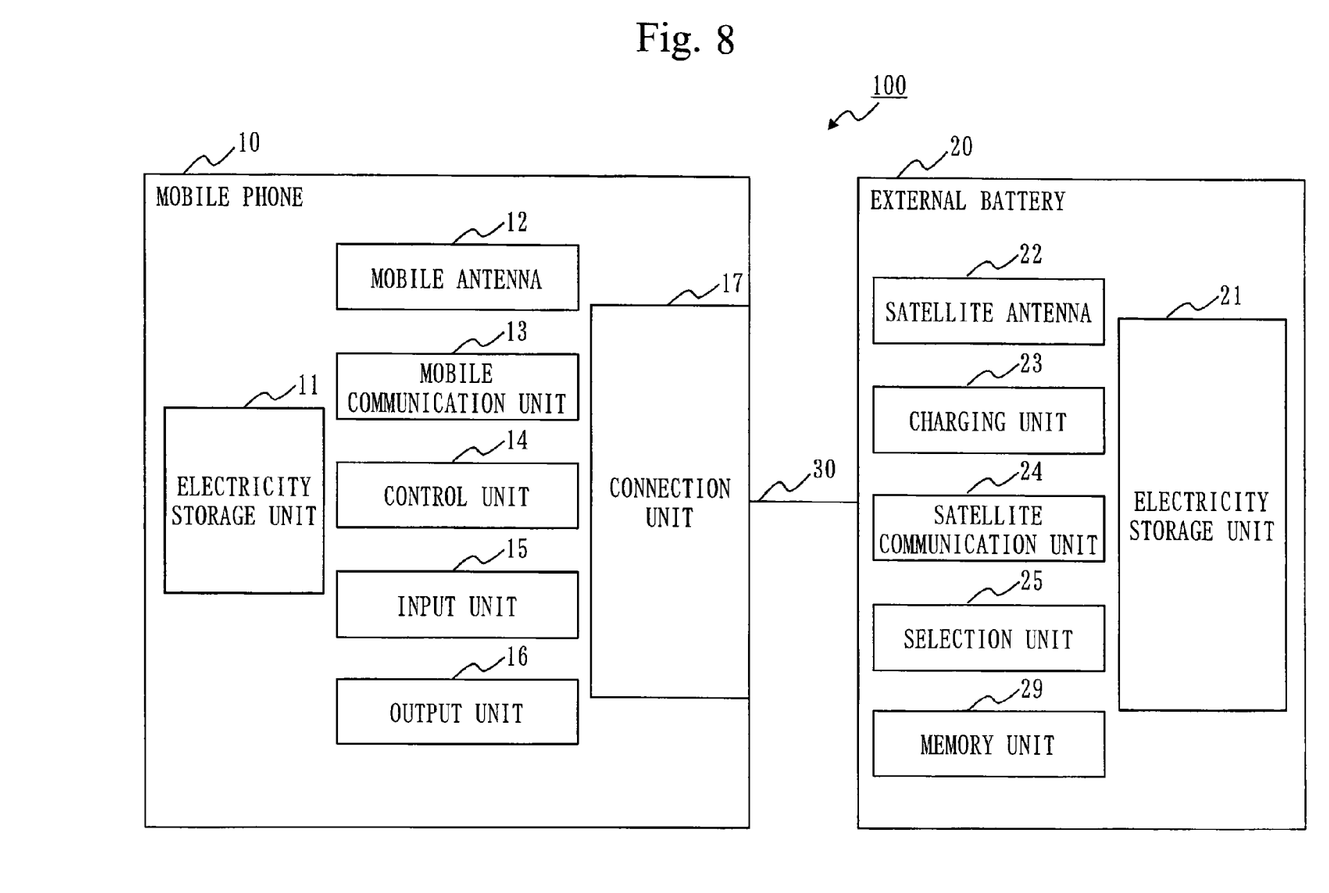
FIG. 8 is a configuration diagram of a satellite communication terminal 100 related to a seventh embodiment.

FIG. 8 is a configuration diagram of a satellite communication terminal 100 related to the seventh embodiment.

The satellite communication terminal 100 shown in FIG. 8 includes, in addition to the configuration of the satellite communication terminal 100 shown in FIG. 1, a memory unit 29 in the external battery 20.

The memory unit 29 is a memory device which stores map information, route information showing an escape route for a case where disaster strikes and the like, information required for securing lifelines, and the like.

The satellite communication terminal 100 is used at the time of contingencies such as a case where disaster strikes and the like. Therefore, the information required in a case where disaster strikes and the like is previously stored, and outputted from the output unit 16 of the mobile phone 10.

Here, at the normal time, the map information, the route information, the information required for securing lifelines, and the like can be obtained from a predetermined website, etc. via the mobile communication or the satellite communication, and such information can be stored in the memory unit 29.

As discussed above, the satellite communication terminal 100 related to the seventh embodiment stores the information required in a case where disaster strikes and the like in the external battery 20. Therefore, in a case where disaster strikes and the like, necessary information can be obtained without performing the communication.

Embodiment 8

The eighth embodiment will explain a satellite communication system 200 using the satellite communication terminal 100 that has been explained in the first through sixth embodiments.

Figure 9:
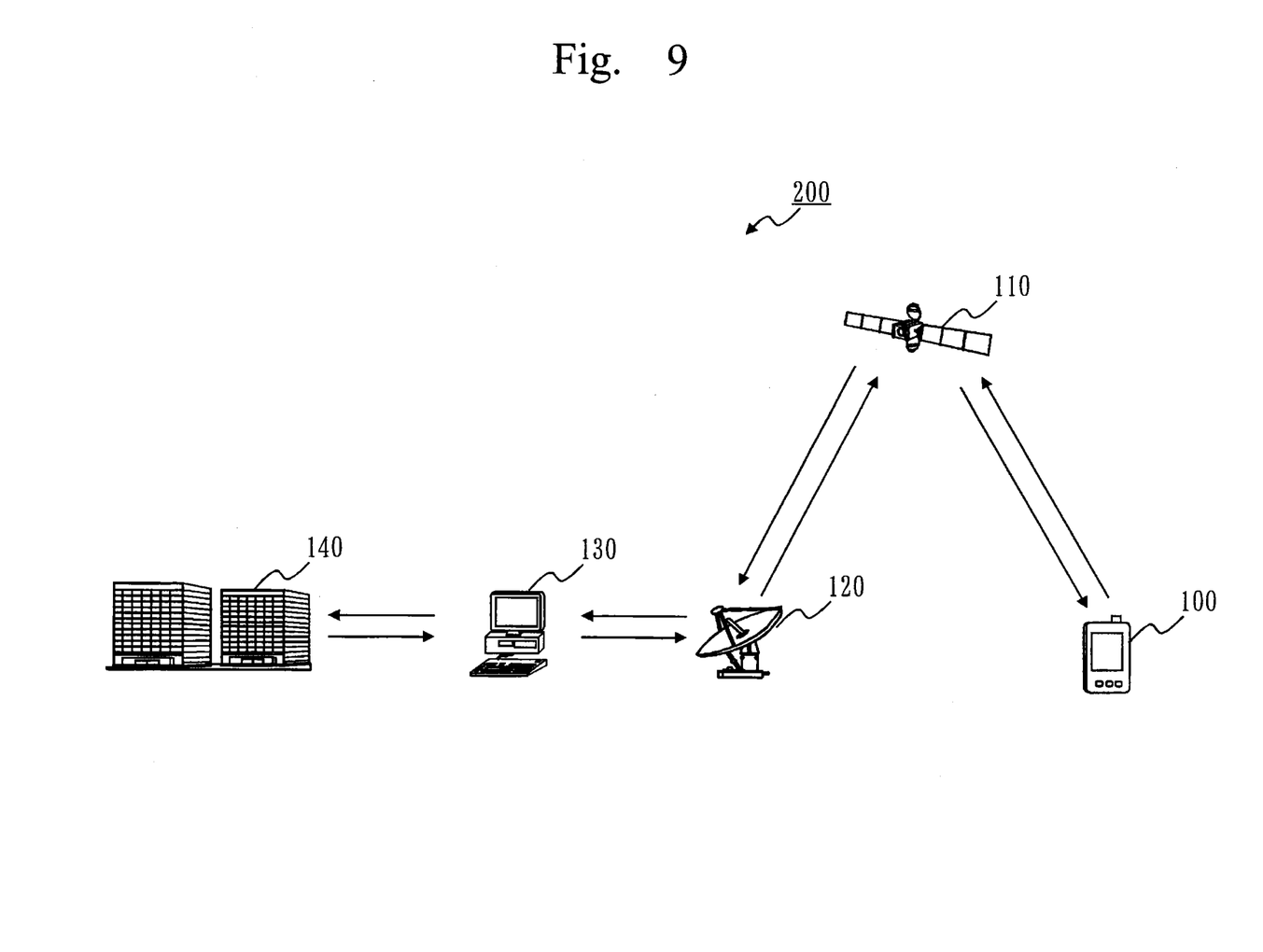
FIG. 9 is a configuration diagram of a satellite communication system 200 related to an eighth embodiment.

FIG. 9 is a configuration diagram of the satellite communication system 200 related to the eighth embodiment.

The satellite communication system 200 includes a satellite communication terminal 100, a quasi-zenith satellite 110, a quasi-zenith satellite antenna station 120, a quasi-zenith satellite operation control station 130, and a disaster center 140.

The satellite communication terminal 100 is the one which has been explained in the first to fifth embodiments. The quasi-zenith satellite 110 is a satellite which stays over a particular area for a long time and takes the quasi-zenith orbit. The quasi-zenith satellite antenna station 120 is a facility settled on the ground having an antenna for transmitting/receiving data to/from the quasi-zenith satellite 3. It is a facility which relays data sent/received by the antenna of the quasi-zenith satellite antenna station 120. The disaster center 140 is a facility which receives the rescue requests and collects the safety information.

In a case where disaster strikes and the like, the satellite communication terminal 100 communicates with the disaster center 140 through the satellite communication via the quasi-zenith satellite 110, the quasi-zenith satellite antenna station 120, and the quasi-zenith satellite operation control station 130. Then, the rescue request and the safety information are sent to the satellite communication terminal 100.

For instance, in a case where the rescue is requested, the satellite communication terminal 100 conveys the status of the site (for instance, the number of injured persons or the conditions of the injured), not only requests the rescue, to the disaster center 140. Further, from the disaster center 140, the information such as within how many minutes the rescue could reach the site, how to do first aid and the like is conveyed to the satellite communication terminal 100.

Here, in the above explanation, the satellite communication system 200 which requests the rescue and the like using the satellite communication terminal 100 has been discussed. Here, COSPAS-SARSAT is known as a system which requests the rescue using the satellite communication channel.

In this system, when a beacon transmitter which is called E-PIRB (Emergency Position Indicating Radio Beacon) mounted on a ship takes water because of a ship accident and the like, a signal of the rescue signal is issued from the beacon transmitter. The issued signal is detected by the geostationary satellite, and circular orbit satellites measure the location of the issued signal. By this operation, the occurrence of the ship accident and the location of the accident are specified, and immediate rescue activities can be implemented.

This search and rescue system has been also applied to the use on the ground. For instance, in a case of distress in mountaineering and the like, when a mountain climber issues a signal of rescue request by a PLB (Personal Locator Beacon), the issued signal is detected by the geostationary satellite, and circular orbit satellites measure the location of the issued signal.

In this search and rescue system, only the transmitter issues the signal, and there is no means to convey additional information such as the status of the accident site. Further, in this search and rescue system, the signal is sent unidirectionally from the accident site, and the information cannot be sent from the rescue side to the accident site.

Further, E-PIRB and PLB are dedicated terminals for rescue request. This kind of dedicated terminals for rescue request are carried only at special occasion such as mountain climbing and the like, and such terminals are not always carried. Therefore, in a case of contingencies where a disaster like earthquake occurs in urban area, such terminals rarely be carried; and such terminals never be used as a terminal for the rescue request at the time of contingencies.

On the contrary to the above, in the satellite communication system 200, the satellite communication terminal 100 can convey the additional information, and the bi-directional communication can be performed with the disaster center 140. Further, the mobile phone 10 and the external battery 20 which form the satellite communication terminal 100 are to be always carried.

Further, in the above explanation, the transmission/reception power and the antenna gain of the mobile phone 10 are increased, and thereby enabling the satellite communication in the narrow communication band. Without increasing the transmission/reception power and the antenna gain of the mobile phone 10, the satellite communication can be performed by enlarging the antenna at the satellite side.

However, if the antenna at the satellite side is enlarged, the transmission area of the signals from the satellite becomes narrow, and thus the satellite communication area becomes also narrow. Further, as explained in the fifth embodiment, in a case where the satellites send the positioning signals, the positioning accuracy based on the positioning signals becomes low.

Therefore, it is difficult to enlarge the antenna at the satellite side to configure the satellite communication system 200.

Up to the above, the embodiments of the present invention have been explained; among the embodiments, two or more embodiments can be combined and implemented. In another way, among these embodiments, one embodiment can be partially implemented. In another way, among these embodiments, two or more embodiments can be partially combined and implemented. Here, the present invention is not limited to these embodiments, but various modifications can be done according to the necessity.

REFERENCE SIGNS LIST

10: mobile phone; 11: electricity storage unit; 12: mobile antenna; 13: mobile communication unit; 14: control unit; 15: input unit; 16: output unit; 17: connection unit; 18: positioning unit; 20: external battery; 21: electricity storage unit; 22: satellite antenna; 23: charging unit; 24: satellite communication unit; 25: selection unit; 26: authentication unit; 27: signal reception unit; 28: measurement unit; 29: memory unit; 30: cable; 100: satellite communication terminal; 110: quasi-zenith satellite; 120: quasi-zenith satellite antenna station; 130: quasi-zenith satellite control station; 140: disaster center; and 200: satellite communication system.

The invention claimed is:

1. An external battery that charges a mobile communication terminal comprising:
    an electricity storage unit that stores electric power;
    a charging unit that supplies the electric power stored in the electricity storage unit to the mobile communication terminal to charge the mobile communication terminal;
    a satellite antenna to be used when performing satellite communication via a satellite communication channel;
    a satellite communication unit that causes the mobile communication terminal to perform the satellite communication of message including a self-position via the satellite antenna; and
    a selection unit that selects at least one of a charge mode to cause the charging unit to charge and a communication mode to cause the satellite communication unit to perform the satellite communication.

2. The external battery of claim 1, wherein the selection unit, when receiving a predetermined signal via the satellite communication, selects the communication mode.

3. The external battery of claim 2, further comprising:
    an authentication unit that performs user authentication,
    wherein the satellite communication unit causes to perform the satellite communication in cases where the authentication unit succeeds the user authentication and where the predetermined signal is received via the satellite communication.

4. The external battery of claim 3,
    wherein the satellite communication unit causes to perform the satellite communication with only a predetermined communication partner in a case where the authentication unit fails the user authentication.

5. The external battery of claim 1,
    wherein the mobile communication terminal includes a mobile antenna to be used when performing mobile communication via a mobile communication channel, and
    wherein the selection unit selects the communication mode in a case where the mobile communication is not available via the mobile antenna.

6. The external battery of claim 5, further comprising:
    an authentication unit that performs user authentication,
    wherein the satellite communication unit causes to perform the satellite communication in cases where the authentication unit succeeds the user authentication and where the mobile communication is not available via the mobile antenna.

7. The external battery of claim 1, further comprising:
a signal reception unit that receives a positioning signal from a satellite in a case where the selection unit selects the communication mode.

8. The external battery of claim 1, wherein the signal reception unit receives the positioning signal of a plurality of frequency bands.

9. The external battery of claim 1, further comprising:
a measurement unit that measures values of biological information.

10. The external battery of claim 1,
wherein the satellite communication channel is a communication channel using an S band for a communication frequency band.

11. The external battery of claim 1,
wherein the satellite communication channel is a communication channel via a quasi-zenith satellite.

12. The external battery of claim 1, further comprising:
an information memory unit that stores route information showing an escape route.

13. A satellite communication terminal comprising the external battery of claim 1.

14. A satellite communication terminal having a mobile communication terminal and an external battery that charges the mobile communication terminal,
wherein the external battery includes:
an electricity storage unit that stores electric power;
a charging unit that supplies the electric power stored in the electricity storage unit to the mobile communication terminal to charge the mobile communication terminal;
a satellite antenna to be used when performing satellite communication via a satellite communication channel;
a satellite communication unit that causes the mobile communication terminal to perform the satellite communication via the satellite antenna; and
a selection unit that selects at least one of a charge mode to cause the charging unit to charge and a communication mode to cause the satellite communication unit to perform the satellite communication.

* * * * *